Dec. 27, 1966　　　J. N. APGAR, SR　　　3,294,414
LOAD APPORTIONING TANDEM SUSPENSION STRUCTURE FOR VEHICLES
Filed June 11, 1965
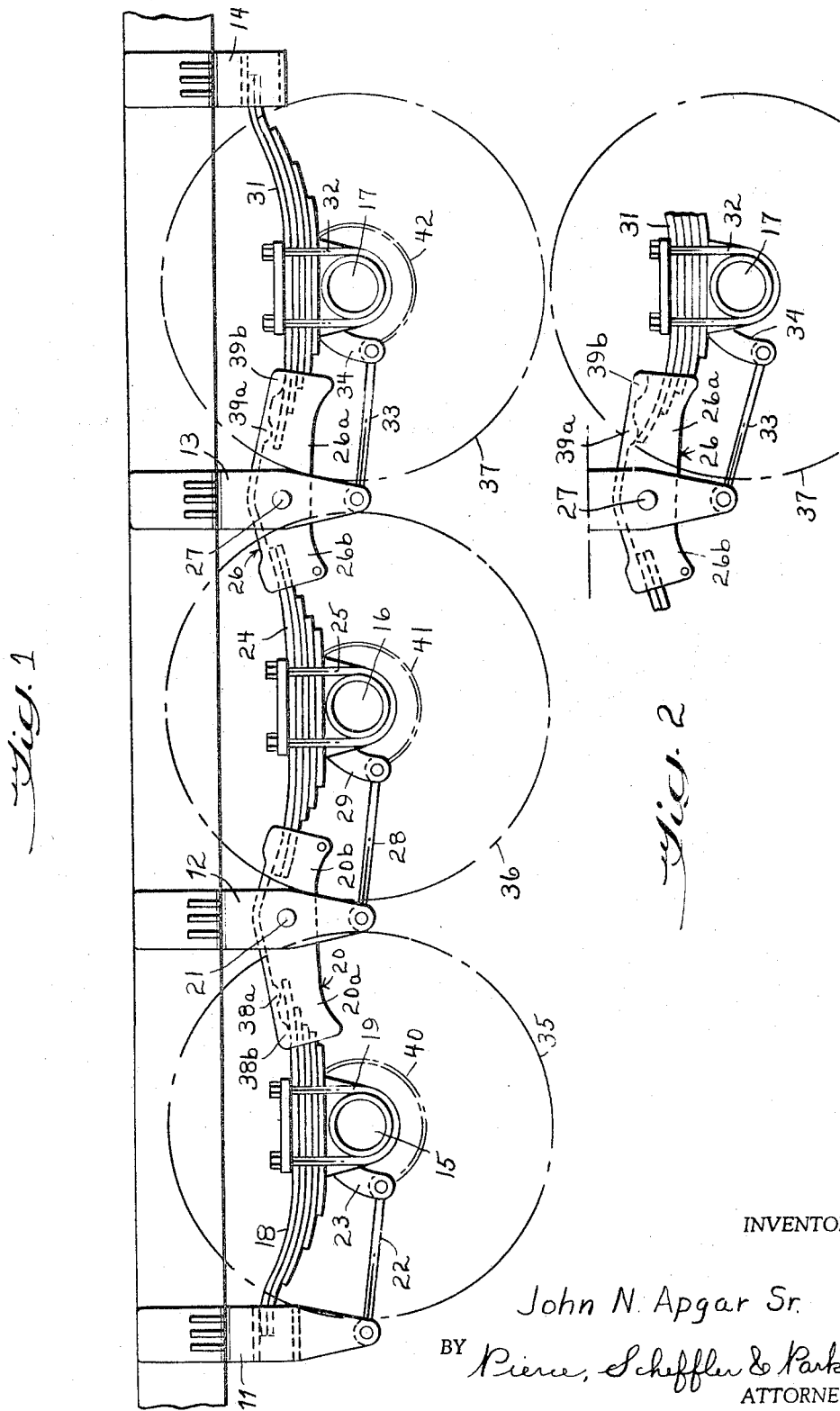
INVENTOR
John N. Apgar Sr.
BY Pierce, Scheffler & Parker
ATTORNEYS

United States Patent Office 3,294,414
Patented Dec. 27, 1966

3,294,414
LOAD APPORTIONING TANDEM SUSPENSION
STRUCTURE FOR VEHICLES
John N. Apgar, Sr., 644 N. Metafe,
Bound Brook, N.J. 08805
Filed June 11, 1965, Ser. No. 463,305
1 Claim. (Cl. 280—104.5)

The present invention relates to tandem axle constructions and more particularly to an improved tandem structure which involves an assembly of three dead axles all of which are non-steerable and incapable of shifting laterally, and is an improvement upon the tandem structure disclosed in my co-pending application Serial No. 325,244 filed November 21, 1963 now Patent No. 3,202,440.

When tandem axle assemblies are utilized in particular as the so-called "rear" axle of a semi-trailer vehicle, wherein the multiple axle assembly is located at the rear of the trailer and the forward end of the trailer is connected by a fifth wheel to the conventional tractor unit the rear axle of which applies the driving power to the vehicle, it is obvious that much difficulty is encountered when negotiating a turn in the road. This is, of course, due to the fact that no one of the axles involved can function as the sole pivot axle about which the turn is to be made. Consequently, unless some special provision is made for alleviating this condition the turn is negotiated only with great difficulty involving severe stresses on the overall structure including the hangers, springs and wheels which can very well lead to wrecking and fatal road accidents. Even in the absence of a breakdown, especially when the axle assembly is heavily loaded, severe scuffing of the tires always occurs which not only reduces tire life but also increases the danger of blow-out by pulling the tire off the wheel as a result of the severe lateral stress imposed where the tire makes contact with the ground.

Various expedients have been suggested for solving this problem but all of them so far developed are either too complicated and/or too expensive. For example, as disclosed in U.S. Patent No. 2,296,681, it has been known to arrange one or more axles of the tri-axle assembly for lateral movement to facilitate negotiation of turns. It has also been suggested to make one or more of the axles steerable, but this also involves much complication as regards structure and is likewise considerably expensive.

In accordance with the improvement disclosed in my aforesaid application Serial No. 325,244, provision is made for an asymmetrical division of the load in such manner as to impose a heavier portion of the total load on the middle one of the three axles of the tandem and lesser and preferably equal portions of the load on the leading and trailing axles. By making the middle axle carry more of the load, that axle tends to establish the pivot axis for turning and hence, makes it more easy for the leading and trailing axles to follow due to the substantial decrease in drag.

In addition to the asymmetrical division of load on the tri-axle assembly under load conditions, the present improvement also provides for a symmetrical division of the weight on the tri-axle assembly under essential no-load conditions in order that the braking effort applied to the wheels of all three axles may be more-or-less equalized.

The desired result is obtained by utilizing a unique rocker beam structure for supporting the ends of the leaf springs associated respectively with the three axles of the tandem, these rocker beams featuring alternatively operable pads for transferring the load from the rocker beams to the springs, the pads being located at pre-selected distances from the rocker beam axis so that the effective lengths of the lever arms of the rocker beams are equal under a no-load condition but are of unequal length under a load condition. When the effective lengths of the lever arms are the same, each axle will receive the same proportion of the total load imposed upon the tandem thereby to better equalize the braking effect on each of the three axles. When the lever arms of the beams are of unequal length, the total load imposed upon the tandem is proportioned asymmetrically between the three axles such that the middle axle receives a greater share of the load than that carried respectively by the leading and trailing axles.

The foregoing as well as other objects and advantages inherent in the invention will become more apparent from the following detailed description of one embodiment thereof and from the accompanynig drawings wherein:

FIG. 1 is a view in side elevation of one embodiment of the improved tri-axle tandem developing automatically selective asymmetrical load distribution on the three axles so that under load conditions the center axle carries more of the load than do the trailing and leading axles, while under a no-load condition the load is divided equally between the three axles to effect a general equalization of the braking on each axle; and FIG. 2 is a partial view of the FIG. 1 embodiment under a no-load condition for the tandem.

With reference now to FIG. 1 of the drawing, the chassis of the trailer unit includes side frame members or sills 10 extending longitudinally of the trailer. Only one of the sills and the corresponding side of the tri-axle suspension are shown in the drawing. However, the sill at the opposite side of the trailer chassis and the axle suspension are of identical ocnstruction. Four equally spaced hanger brackets 11 to 14 depend from the sills. The three dead axles of the tandem assembly are indicated at 15, 16 and 17 and each one of these axles is positioned between a pair of the brackets and secured thereto by a spring suspension. The spring suspension for the lead axle of the group, i.e. axle 15, includes a conventional multi-leaf type spring 18 which is secured fast at its middle portion to the axle 15 by means of a U-bolt 19. The front end of spring 18 is received within a recess in the front bracket 11, and the rear end of this spring is received within one arm 20a of rocker beam 20 which is pivotally mounted within bracket 12 by means of a pivot pin 21. A torque arm 22 extends between an arm 23 secured rigidly to axle 15 and a lower extended portion of bracket 11, and is connected at both ends to these members by means of articulated joints.

The spring suspension for the middle axle 16 includes a similar multi-leaf spring 24 secured fast at its middle portion to axle 16 by means of U-bolt 25. The front end of spring 24 is received within the other shorter arm 20b of the rocker beam 20 and the rear end of spring 24 is received within one arm 26b of rocker beam 26 which is pivotally mounted within bracket 13 by means of pivot pin 27. A torque arm 28 extends between the lower end of bracket 12 and an arm 29 rigidly secured to axle 16, and the connections at the ends of the torque arm are of the articulated type.

The spring suspension for the rear axle 17 includes a multi-leaf spring 31 secured fast at its middle portion to axle 17 by means of a U-bolt 32. The front end of spring 31 is received within the other, longer arm 26a of rocker beam 26 and the rear end of spring 31 is received in a recess within the rearmost bracket 14. A torque arm 33 articulated at both ends, extends between the lower end of bracket 13 and an arm 34 rigidly secured to axle 17.

Pneumatically tired wheels 35, 36 and 37 are mounted on opposite ends of the axles 15, 16 and 17 and these have been shown by dashed lines only since their mounting is conventional and does not constitute any part of the inventive concept to which this application is directed.

Each of the wheels is also provided with conventional braking means, and these are indicated generally at 40, 41 and 42 respectively.

As explained at the outset of the specification, all of the axles 15 to 17 are of the "dead" type and together with the wheels thereon always remain in essentially parallel relation and transverse to the direction of travel of the trailer. The axles can, of course, move up and down due to the spring suspension but there is no steering provided for the wheels or axles and also there is no lateral shifting of the axles. Consequently, the construction of the tri-axle tandem is relatively simple and inexpensive so far as tri-axle tandems are concerned.

As pointed out in the introduction, notwithstanding the fact that the axles cannot shift laterally and are not steerable, the axle assembly is still able to negotiate turns with a minimum amount of stress and tire distortion. This is attributable to the unique manner in which the load is divided between the three axles. Were the forwardly and rearwardly projecting lever arms 20a, 20b and 26a, 26b of the rocker beams 20 and 26 to have the same effective length under load conditions, the weight carried by the three axles would then be divided equally between them. However, in accordance with the invention, these rocker beams have forward and rearward lever arms of unequal length under load conditions and are so arranged that the middle axle 16 will carry more of the total load than earlier of the other two axles. In particular, it will be seen from the drawing that the longer arm 20a is provided with two pads 38a and 38b. Similarly the longer arm 26a is provided with two pads 39a and 39b. These pads 38a, 38b and 39a, 39b function alternatively in relation to engagement with the appertaining ends of spring 18 and 31. Under a loaded condition of the tandem as depicted in FIGURE 1, all of the springs 18, 24 and 31 are considerably flattened out to such an extent that at rocker beam 20 the appertaining end of spring 18 engages only the pad 38b which is farthest from the pivot axis 21 of the rocker beam. Similarly the appertaining end of spring 31 engages only pad 39b which is farthest from the pivot axis 27 of rocker beam 26. Thus, under a loaded condition of the tandem, the effective length of the lever arm 20a is longer than that of the lever arm 20b of rocker beam 20 and similarly the effective length of lever arm 26a is greater than that of lever arm 26b of rocker beam 26 with the result that the middle axle 16 will be subjected to a greater share of the load than is carried by either the lead axle 15 or the trailing axle 17.

Under a condition of no-load, however, as depicted in the partial view of FIG. 2 which shows only the condition prevailing at rocker beam 26, it will be noted that spring 31 has a much sharper curvature in the upward direction with the result that the end portion of the spring leaves its point of engagement with pad 39b and establishes contact with the other pad 39a which is closer to the pivot axis 27 of rocker beam 26 by an amount sufficient to make the effective length of lever arm 26a the same as that of lever arm 26b. The same effect takes place at the other rocker beam 20 wherein the end of spring 18 will then engage only the inner pad 38a and thus make the effective lengths of lever arms 20a and 20b alike. With the lever arms 20a, 20b and 26a, 26b of the same effective length, then the weight carried by the tandem will become symmetrically divided as between the three axles 15, 16 and 17. With equal division of weight, the braking action on each axle applied by the brakes 40, 41 and 42 will be alike thus minimizing a wheel locking effect at any of the axles.

I claim:

In a tri-axle tandem assembly for carrying the load at the rear end of a semi-trailer unit, the combination comprising four depending hanger brackets spaced longitudinally along each side of said semi-trailer unit, three dead non-steerable wheeled axles secured in parallel, spaced relation transverse to the longitudinal axis of said trailer unit, and located between said hanger brackets, braking means for the wheels on each axle, a leaf spring individual to and secured intermediate the ends thereof to each of said axles, the front and rear hanger brackets serving to carry the front and rear ends of the front and rear springs respectively, rocker beams pivotally mounted on the inner two brackets at each side of said semi-trailer unit, the two lever arms of said rocker beams extending towards each other and which carry corresponding ends of the leaf springs secured to the center axle being shorter than the other two lever arms of said rocker beams, each of said longer lever arms of said rocker beams including a pair of pads alternatively engageable with the corresponding ends of the leaf spring units secured to the lead and trail axles, the pads of each pair being located in spaced relation in a direction longitudinally of the leaf spring such that only the pad farthest from the pivot axis of the rocker beam engages the end portion of the leaf spring when said tandem operates under its loaded condition thereby to establish an asymmetrical division of the total load on said axles wherein the center axle carries more load than do the lead and trail axles whereas only the pad closest to the pivot axis engages the end portion of the leaf spring when said tandem operates under a no-load condition thereby to shorten the effective length of said longer lever arm and make it substantially equal to the effective length of said shorter lever arm thereby to establish a substantially symmetrical division of the loading on said axles and effect a substantially equal braking effect on all wheels.

References Cited by the Examiner

UNITED STATES PATENTS 3,121,574   2/1964   Hockensmith _____ 280—104.5

BENJAMIN HERSH, *Primary Examiner.*

P. GOODMAN, *Assistant Examiner.*